United States Patent [19]

Moench et al.

[11] Patent Number: 5,731,366
[45] Date of Patent: Mar. 24, 1998

US005731366A

[54] SELF-SUPPORTING PLUGGING COMPOUND

[75] Inventors: Monika Moench, Landsberg; Peter Mauthe, Tuerkheim; Fritz Ziegert, Lambsheim; Stefan Schwiegk, Neustadt, all of Germany

[73] Assignees: DSM Resins B.V., Zwolle, Netherlands; Hilti AG, Waldstetten, Germany

[21] Appl. No.: 542,920

[22] Filed: Oct. 13, 1995

[30] Foreign Application Priority Data

Oct. 28, 1994 [DE] Germany .......................... 44 38 577.3

[51] Int. Cl.$^6$ .............................. C09K 3/00; B32B 5/18
[52] U.S. Cl. ............... 523/211; 428/402.2; 428/402.21; 428/402.24; 523/508; 523/521; 525/445; 524/533; 526/301
[58] Field of Search ............................ 526/301; 525/445; 523/211, 521, 508; 524/533; 428/402.2, 402.21, 402.24

[56] References Cited

U.S. PATENT DOCUMENTS

| | | | |
|---|---|---|---|
| 4,362,566 | 12/1982 | Hinterwaldner | 524/6 |
| 4,940,852 | 7/1990 | Chernack | 523/211 |

FOREIGN PATENT DOCUMENTS

| | | |
|---|---|---|
| 0199671 | 10/1986 | European Pat. Off. . |
| 0501176 | 9/1992 | European Pat. Off. . |
| 3203596 | 8/1983 | Germany . |
| 3617702 | 12/1987 | Germany . |
| 4406646 | 9/1995 | Germany . |
| 2 028 451 | 3/1980 | United Kingdom . |

*Primary Examiner*—Andrew E. C. Merriam
*Attorney, Agent, or Firm*—Oblon, Spivak, McClelland, Maier & Neustadt, P.C.

[57] ABSTRACT

A plugging compound for chemical fastening technology is based on a free-radically polymerizable resin and a free-radical initiator spatially separated therefrom. The plugging compound in question is a self-supporting and storage-stable material which can be inserted in that form directly into a drill-hole.

10 Claims, No Drawings

SELF-SUPPORTING PLUGGING COMPOUND

The present invention relates to a plugging compound for chemical fastening technology which is based on a free-radically polymerizable resin.

The use of reactive resin compositions based on unsaturated polyester resins, vinyl ester resins or vinyl ester urethane resins as binders for chemical fastening technology is well known. The reactive resin systems in question are two-component systems, of which one component includes the reactive resin and the other the free-radical initiator. One and/or the other of the components may include other customary ingredients such as fillers, accelerants, stabilizers, solvents, including reactive solvents (comonomers). Mixing the two components then initiates the reaction which leads to the formation of a cured product.

To fix anchor bolts in holes drilled into concrete or solid rock it is generally customary to use glass capsules comprising 2 chambers to keep the components in the capsule apart (see for example EP-A-199 671). The capsule is inserted into the drill-hole. Then the fastening element is inserted by rotary percussion, destroying the capsule and the chambers. The two components become mixed, initiating the reaction. The cured resin composition is capable of inducting force into the substrate without lateral expansion pressure. Such anchorages have proved useful in particular for heavy-duty fixtures.

In the case of anchorages in concrete and in particular in a porous or hollow substrate, for example in cavity brick, foamed concrete block or mud brick, it is possible to use two-chamber cartridges (see for example DE-A-36 17 702). The two components of the plugging compound are simultaneously expressed from the cartridge, mixed by suitable means, for example screws or static mixers, and forced into the drill-hole. The drill-hole can then be entered directly with an anchorable fastening element of any desired cross section, which becomes fixed in the drill-hole when the resin has cured; or first a plug or an internal threaded sleeve is inserted into the hole and fixed in place by the curing of the resin, and screws or bolts can then be screwed or bolted in.

Two-chamber glass capsules have the disadvantage that they are complicated and expensive to make and easily breakable.

Two-chamber cartridges likewise have a complicated construction and they require an additional mixing and expressing means. Owing to the limited pot life, the premixed components have to be squeezed into the drill-hole in rapid succession; moreover, waste is virtually impossible to avoid.

It is an object of the present invention to develop a rapid curing plugging compound for chemical fastening technology, which is simple to prepare, easy to handle and easy to apply without any need for elaborate packaging or special applicators.

We have found that this object is achieved when the plugging compound is in the form of a self-supporting and storage-stable material which can be directly inserted into the drill-hole in that form.

The present invention accordingly provides a plugging compound comprising

A. a free-radically polymerizable resin,
B. optionally a comonomer,
C. a free-radical initiator,
D. a polymerization accelerant,
E. optionally a thickener for the resin,
F. fillers, said plugging compound being a self-supporting and storage-stable material which can be introduced in that form directly into the drill-hole and said free-radical initiator C or said accelerant D being embedded in the matrix of the other ingredients as a separate phase separated from said matrix.

Self-supporting means in this context that the plugging compound is handleable without packaging, for example in the form of a sturdy sleeve, at room temperature or slightly elevated temperature. Storage-stable means that the plugging compound can be stored for a prolonged period, preferably longer than 6, especially longer than 12, months, without polymerizing. The plugging compound preferably has a firm, form-stable consistency and a dry surface.

EP-A-199 671 describes adhesive compositions based on acrylate resin and their use for anchorages. The adhesive compositions include two essential ingredients, namely a reactive resin and a hardener, which may also be microencapsulated. These ingredients can be introduced into the drill-hole separately or, directly after mixing, together. However, self-supporting, storage-stable plugging compounds are not described, nor does this reference provide any motivation for solving the above-described problem.

DE-A-32 03 596 describes a kneadable composition for anchoring anchor bolts. The composition consists of an epoxy resin on the one hand and a microencapsulated amine hardener on the other. However, epoxy resins and amine hardeners, being skin irritants, are unsuitable for manual applications; moreover, the curing of the compositions generally takes many hours to several days, so that fixing an anchor bolt is very time-consuming. Finally, strong shearing has to be used to create the comparatively high temperature necessary for curing most epoxy resin systems.

GB-A-2 028 451 describes a capsule for anchoring bolts which comprises either both components in macrocapsules or only one component in macroencapsulated form and the other in liquid form. A specific embodiment comprises a self-supporting plugging compound in which both the components are macroencapsulated. However, encapsulating the resin component, which massively predominates in terms of volume, is very costly.

The individual components of the plugging compound of the present invention will now be more particularly described.

A. Suitable free-radically polymerizable resins are:
1. unsaturated polyesters (UP)
2. vinyl ester resins (VE)
3. vinyl ester urethane resins (VU)

1. Unsaturated polyesters are the customary condensation products of dicarboxylic acids or their esterifiable derivatives, especially their anhydrides, which have been linked in ester fashion with polyhydric, especially dihydric, alcohols, and optionally additionally contain radicals of monobasic carboxylic acids or monohydric alcohols, although at least some of the starting materials must have unsaturated, copolymerization-capable groups.

2a. VE resins, which are also known as epoxy (meth) acrylates, are generally addition products of polyepoxides with unsaturated monocarboxylic acids, preferably with methacrylic acid. These resins are described for example in GB-A-1 006 587 and in U.S. Pat. Nos. 3,066,112 and 3,179,623, preference being given to using VE resins based on bisphenol A. They are notable for toughness and chemical resistance coupled with limited heat resistance. VE resins based on epoxy novolak resins and (meth)acrylic acid, as described for example in U.S. Pat. No. 3,256,226, by contrast, have better heat resistance properties but inferior toughness properties.

Characteristic for the class of the VE resins is the group

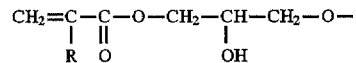

where R=H or CH$_3$.

2b. Another class of VE resins are esterification products of optionally alkoxylated bisphenol A with (math)acrylic acid, for example as described in EP-A 534 201.

3. VU resins, also known as urethane (meth)acrylates, are known for example from U.S. Pat. No. 3,297,745, U.S. Pat. No. 3,772,404, U.S. Pat. No. 4,618,658, GB-A-2 217 722 and DE-A-37 44 390. They generally have the following groups:

a) 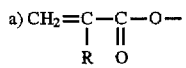

(where R=H or CH$_3$)

b) 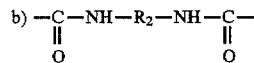

(where R$_2$ is a bivalent aliphatic, aromatic or cycloaliphatic radical of from 4 to 40 carbon atoms, preferably an aromatic radical of from 6 to 20 carbon atoms), c) —O—R$_3$—O—
(where R$_3$ is a bivalent aliphatic, cycloaliphatic or aromatic radical of from 2 to 500 carbon atoms, preferably an aliphatic radical of from 4 to 100 carbon atoms),
and also optionally d) —NH—R$_4$—NH—
(where R$_4$=an aliphatic, cycloaliphatic or aromatic radical of from 2 to 100 carbon atoms).

The VU resin is preferably a reaction product of
a polyfunctional isocyanate,
optionally a polyfunctional alcohol,
optionally a polyfunctional amine,
a hydroxyalkyl (meth)acrylate,
in a weight ratio of isocyanate to (alcohol+amine) within the range from 100:10 to 100:300, the equivalent ratio of hydroxyalkyl (meth)acrylate to the free isocyanate groups of the reaction product being within the range 3:1 to 1:2. By blending the resins with one another it is possible to set the softening range of component A in a specific manner.

B. Suitable comonomers are the customary comonomers used with reactive resins, preferably in amounts of up to 200% by weight, based on A. The level of comonomer depends on the viscosity desired for the resin (in the case of reactive resins A to be thickened) or on the crystallization tendency in the case of crystalline reactive resins A. In principle, comonomer-free plugging compounds are also possible. Preferred comonomers B are (meth)acrylic esters, for example butanediol dimethacrylate, ethylene glycol dimethacrylate, acetacetoxyethyl methacrylate or (optionally ethoxylated) bisphenol A dimethacrylate; also cycloaliphatic compounds with ethylenically unsaturated substituents as described in DE-A-39 40 138; styrene and substituted styrenes, such as tert-butylstyrene and vinyltoluene; and also mixtures thereof.

A conventional comonomer, especially in the case of UP resins, is styrene. In applications where the styrene odor would be unwelcome it is possible to use VE or VU resins in combination with butanediol dimethacrylate or tert-butylstyrene, optionally together with a high boiling (boiling point higher than 120° C.) methacrylic ester.

C. The free-radical initiator C is preferably embedded as a separate phase in the coherent matrix of the other ingredients and is spatially separated from this matrix, i.e. from reactive resin A, comonomer B and accelerant D, to such an extent that no premature polymerization can occur.

Preferred initiators are organic peroxides which, when used together with accelerants, can decompose into free radicals, and initiate the polymerization, at room temperature. Particularly highly suitable are dibenzoyl peroxide, 2,4,2',4'-tetrachlorobenzoyl peroxide, 2,2'-dimethylbenzoyl peroxide and methyl ethyl ketone peroxide, also tert-butyl perbenzoate, cyclohexanone peroxide, lauroyl peroxide and cumene hydroperoxide, and also tert-butyl peroxy-2-ethylhexanoate. The peroxides are preferably used in amounts from 0.5 to 15% by weight, preferably from 1 to 8% by weight, based on A. The initiator has generally been dissolved or dispersed in a phlegmatizer, for example phthalates, adipates, silicone oil or water, or applied to a carrier, for example gipsum.

The spatial separation of the initiator from the resin is preferably effected by encapsulation by, for example, welding it (as a macrocapsule) with a diameter from 2 to 20 mm in glass ampoules or enrobing it for example with gelatin or cellulose as a microcapsule with a diameter from 0.05 to 1 mm. The capsules are preferably uniformly distributed in the matrix of the plugging compound.

In another preferred embodiment, the initiator is disposed without encapsulation in a separate cavity, for example in a coaxial core or edge section of the cylindrical plugging compound. In this case a thin cured layer will form at the phase boundary and act as a spatial separator. The initiator can also be introduced into the cavity wrapped in a film.

D. Suitable polymerization accelerants include—in amounts from 0.1 to 4% by weight, based on A—tertiary aromatic amines, such as dimethylaniline, dimethyl-p-toluidine, diisopropyl- p-toluidine, diethylaniline or diethanol-p-toluidine, or redox-active metal salts, such as cobalt stearate. In principle, the accelerant D may also be encapsulated instead of the initiator C.

The spatial separation of initiator C and accelerant D can also be brought about by incorporating these components in each case with the remaining ingredients in two separate layers which are placed one on top of the other and rolled up together.

E. In the case of the reactive resin A being a UP resin, preference is given to using the customary thickeners based on oxides or hydroxides of magnesium, of calcium, of lithium or of aluminum in amounts of from 0.1 to 10% by weight, based on A, optionally together with thickening accelerants, for example choline chloride or partial esters of polyetherpolyol and maleic anhydride. Especially in the case of VE and VU resins which normally contain no carboxyl groups the resin has to be combined with thickening additives, such as carboxyl-containing vinyl polymers (as described in EP-A-501 176) or partial esters of a polyetherpolyol and a dicarboxylic anhydride (as described in DE-A-44 06 646), before the addition of thickener.

Further suitable thickeners are finely divided silicas or bentones, such as montmorillonite, in amounts from 0.1 to 10% by weight, based on A. According to resin type and comonomer, these thickeners, to be fully effective, require a surface modification, for example in the form of a hydrophobicization with silanes. Another preferred class of thickeners are the below-described crystalline reactive resins which are added to the amorphous reactive resin A in amounts from 10 to 100% by weight. The prerequisite for their thickening effect is that amorphous and crystalline reactive resin are not compatible at temperatures below 50° C., so that, on mixing, the amorphous reactive resin is present as the coherent phase and the crystalline reactive resin as the dispersed phase. Also suitable are crystalline waxes, for example stearates and palmitates, and reactive crystallizers, for example based on diisocyanates and symmetrical amines.

F. A distinction has to be made between coarse and finely divided fillers. Coarse fillers, for example quartz sand, glass splinters, corundum or stoneware with a particle size from 0.01 to 5 mm, are used in amounts of up to 1000% by weight, based on A.

Finely divided reinforcing fillers used for the binder matrix include for example quartz powder, glass powder, barite, lightspar, talc and chalk. The fillers can be used as fibers, for example mineral or synthetic fibers. Preferable and distinctly more reinforcing are globular fillers.

If comonomers having a high vapor pressure are used, it is advantageous to prevent the evaporation of the comonomer. A convenient way of doing this is a coating with a diffusion barrier. In the important case of a styrene-containing reactive resin, diffusion can be appreciably delayed by a film of polyvinyl alcohol. For this, polyvinyl alcohol is dissolved and the plug is coated with the solution. The layer thickness (preferably within the range from 0.1 to 100 μm) can be set through the viscosity of the solution. The coating is then dried.

The consolidation of the reactive resin can be accomplished for example as follows:

In a first variant, component A comprises crystalline or at least partially crystalline reactive resins. Crystalline UPs are those based on symmetrical, unbranched dicarboxylic acids and diols, for example fumaric acid, terephthalic acid and adipic acid on the one hand and ethylene glycol, 1,4-butanediol and 1,6-hexanediol on the other. They may optionally contain small amounts of asymmetrical dicarboxylic acids or diols.

Crystalline VE resins are prepared by reacting linear and symmetrical bisepoxides, preferably based on bisphenol A, with an excess of epichlorohydrin and subsequent esterification with methacrylic acid. Crystalline VE resins are also obtained on esterifying nonethoxylated or uniformly ethoxylated bisphenol A with methacrylic acid. Crystalline VU resins can be prepared using linear and symmetrical diols and diisocyanates. Particularly suitable for this purpose as diisocyanates are MDI, TDI and 1,6-HDI, as diols are 1,2-ethylene glycol, 1,4-butanediol, 1,6-hexanediol and neopentylglycol. The reaction of the NCO-terminated prepolymer preferably takes place with hydroxyethyl methacrylate. The crystallization can be accelerated by the addition of nucleating agents, such as potassium stearate, talc or very finely divided crystalline reactive resins. Similarly, mixtures of the crystalline reactive resins with up to 20% of their weight of crystalline saturated polyesters are effective. The crystalline reactive resins should have a melting point above 50° C. in order that the plugging compound does not soften on storage. Of particular advantage are melting points within the range from 60° to 120° C.

In another variant, the reactive resins are thickened, advantageously after they have been mixed with the other additives. The thickening process can take place at room temperature or be accelerated by raising the temperature to above about 50° C. Suitable for use as thickenable UP resin are basically all polyester resins suitable for SMC or BMC applications. Preference is given to recipes which result in a very rapid increase in the viscosity. If desired, the thickening may be augmented by adding thickening accelerants. VE and VU resins cannot be thickened according to standard recipes, since they contain no carboxyl groups. For use as a plugging resin it is therefore necessary to modify the resin. This can be done for example by reaction with maleic anhydride. Similarly, thickening can be achieved by adding thickening additives. Such thickening additives are described above.

The thickening can further be brought about by adding silica as a fine powder to the liquid mixture of resin A and comonomer B. When the components are mixed by shearing, the compound is liquid, so that good homogenization is achieved. When the shearing is ended, the compound rigidifies. In the case of crystalline reactive resins as thickeners E, the consolidation can take place in three ways. The crystalline resin can be introduced as a solid into the solution of amorphous resin A and comonomer B, followed by heating to dissolve the crystalline resin, and cooling, or the crystalline resin can be added as a melt to a hot solution of amorphous resin A in comonomer B, followed by mixing and cooling. Finally, melts of crystalline and amorphous resin A can also be mixed, admixed with comonomer B and cooled. All three cases produce, on rapid cooling, fine crystallites which are dispersed in the liquid phase and bring about thickening.

In a preferred way of preparing the plugging compound of the present invention, a liquid or liquefied reactive resin A has the additives added to it and mixed in. Crystalline reactive resins are melted before or after their addition, while thickenable reactive resins are added liquid. The mixture is then formed into a strand, which is consolidated and optionally cut into cylindrical pieces. The strand can be produced batchwise by introducing the mixture into a tube or a hollow cylinder; preferably it is carried out continuously by effecting the mixing in an extruder. Solid, crystalline reactive resins have to be melted at elevated temperatures at which there is a danger that, for example, microencapsulated initiators will decompose prematurely. It is therefore advisable not to mix in the initiator from the start but, when forming the strand, to form one or optionally more cavities into which the initiator can be introduced once the strand has cooled and consolidated. This is advisable even when, in the case of thickenable reactive resins, the thickening is effected by raising the temperature to above about 50° C. Examples of suitable cavities are coaxial recesses in the core or at the edge of the strand. If the thickening is carried out at temperatures below 50° C., for example at room temperature, then microencapsulated initiators can be mixed in right from the start. In this case care has to be taken to ensure that the capsules are not prematurely destroyed by the shearing forces in the extruder. This can happen for example when a twin-screw extruder is used. Following extrusion from a round die with or without cooling, the compound consolidates into a strand which is cut into cylindrical pieces. In the case of thickened resins it can be advantageous to provide, downstream of the extruder, a tube in which the thickening process can proceed. The mixing of the resin with the additives can also be carried out in free-fall mixers or planetary mixers.

In another preferred method, the compound is consolidated in a hollow mold. This mold preferably has the shape of the drill-hole in which the plug is later to be inserted. It may also have an optional shape, for example a spherical shape. In the case of crystalline reactive resins these are poured as a melt, together with the additives, into a cooled hollow mold which advantageously has an adhesive coating on the inner surface. Here too it is again advantageous not to add the initiator C from the start, but to introduce it into the compound shortly before the consolidation or, after consolidation, into specially provided cavities. If desired, coarse fillers may be initially charged into the hollow mold. After cooling, the ready-produced plugging compound is removed from the mold. In the case of reactive resins which are to be thickened, the mixture is poured into a preferably heated mold, where, because of the elevated temperature, it rapidly thickens and consolidates. It is also possible to pour the mixture into a plastic mold provided with appropriate cavities and to allow it to thicken without heating by virtue of prolonged standing (blister pack).

It is also possible to express the mixture of resin and additives through wide-slot dies, to place the layers obtained on top of one another and to roll them up to form cylindrical rods.

The plugging compound can be variously shaped. Preferably it is cylindrical and has a somewhat smaller diameter than the drill-hole. In this case it is laid onto the base of the drill-hole. However, it can also take the form of round or irregularly shaped particles which have a much smaller diameter than the drill-hole. In this case what is introduced into the drill-hole is the number of particles required for the anchorage point. Similarly, the shape of a hollow cylinder having a somewhat smaller outer diameter than the internal diameter of the drill-hole is conceivable. Finally, a cylindrical plug can also be molded directly onto the lower end of an anchor bolt, or the anchor bolt can be coated with the plugging compound.

The plugging compound of the present invention is used for fixing fastening elements in drill-holes in receiving materials, such as masonry or rock. Preferred fastening elements are machine-settable, rotationally symmetrical elements, such as anchor bolts and threaded sleeves.

Preferably, in this use, the plugging compound is introduced into the drill-hole first, and only then is the fastening element introduced by means of a percussive and/or rotary movement. This liberates the free-radical initiator and/or accelerant, causing mixture with the remaining plugging compound and so initiation of the polymerization of the reactive resin. The cured plugging compound effects a firm bond between fastening element and receiving material.

The parts and percentages mentioned in the Examples are by weight.

EXAMPLES

A. Preparation of starting materials

1. Crystalline VU resin 990 g of 4,4'-diphenylmethane diisocyanate are heated to 70° C. and melted. 0.8 ml of dibutyltin dilaurate catalyst and 100 g of 1,4-butanediol dimethacrylate comonomer are added. At 70° C. initially 484 g of hydroxyethyl methacrylate (HEMA) are added dropwise, and then a solution of 41 g of neopentylglycol and 80 g of HEMA is added dropwise. In the course of the addition the internal temperature rises to 82° C. The batch is subsequently stirred at 80° C. for 30 min. Then 404 g of hydroxyethyl methacrylate (HEMA) are added dropwise, the internal temperature rising to 100° C. The batch is subsequently stirred at 100° C. for one hour. The residual NCO content is found to be <0.01%, and then 0.2 g of phenothiazine, 8.4 g of tert-butylpyrocatechol are added as inhibitors and 57.7 g of diisopropanol-p-toluidine as accelerant.

The resin has a melt viscosity (75° C.) of about 950 mPas and crystallizes on cooling into a waxy solid material having a melting range from about 60° to 80° C.

2. Thickening additive 100 parts of a polyetherpolyol of functionality 3 (ARCOL 3450) are initially charged and mixed with 10.5 parts of maleic anhydride. The mixture is heated under nitrogen to 120° C. and held at that temperature for 4 hours. The resulting partial ester has an acid number of 52.

3. VU resin 575 g of the isomer mixture of diphenylmethane diisocyanate are initially charged at 25° C. Following addition of 0.3 ml of dibutyltin dilaurate, 70.1 g of dipropylene glycol are added dropwise. With slight concomitant heating the internal temperature rises to 55° C. during the addition. The batch is subsequently stirred at 55° C. for 30 min.

Thereafter 792 g of hydroxypropyl methacrylate (HPMA) are added dropwise. During the addition the internal temperature rises to 95° C. under slight concomitant heating. The batch is subsequently stirred at 95° C. for 2 hours (residual NCO content <0.01%). Then 767 g of 1,4-butanediol dimethacrylate comonomer and 256 g of thickening additive (A2) are added. Then 0.25 g of phenothiazine, 10.2 g of tert-butylpyrocatechol and 70 g of diisopropanol-p-toluidine accelerant are metered in.

4. VE resin

To 300 g of bisphenol A diglycidyl ether (Epikote 828 from Shell) is added 0.36 g of dimethylbenzylamine. Then 137 g of methacrylic acid are added dropwise at 85° C. in such a way that the internal temperature rises to 110° C. The batch is stirred under air. When the acid number has dropped below 10, the resin is admixed with 291 g of 1,4-butanediol dimethacrylate and 81 g of thickening additive (A2). Then 0.0 g of phenothiazine, 3.2 g of tert-butylpyrocatechol and also 22.2 g of diisopropanol-p-toluidine are metered in and the formulation is homogenized.

5. VE resin monomer-free 900 g of the reaction product of ethoxylated bisphenol A with 2 mol of methacrylic acid are heated to 60° C. and mixed with 100 g of thickening additive (A2). Then 0.1 g of phenothiazine, 4.0 g of tert-butylpyrocatechol and also 27 g of diisopropanol-p-toluidine are added and the formulation is homogenized.

B. Preparation of plugging compounds 1. 200 g of VU resin A1 were melted at 90° C. and admixed and intimately kneaded with 800 g of quartz filler (average particle size 1 mm). The material is introduced into a 20 cm long Teflon tube which has an internal diameter of 13 mm and in whose core region is located a 3 mm thick pin. After cooling and consolidating, the pin is extracted, and the resulting coaxial cavity is filled with a rod-shaped pressed material consisting of 20% of benzoyl peroxide and 80% of gypsum powder (as phlegmatizer). The result is a self-supporting plugging compound, which is cut into two pieces of equal length.

2. 100 parts of VU resin A3 are mixed with 1.8 parts of magnesium oxide. Then 400 parts of quartz filler are added and the material is intimately kneaded. The material is introduced into a Teflon tube as described under B1 and thickened over 3 hours at 70° C. After the molding, the resulting plugging compound is cut into 2 pieces, and the phlegmatized and encapsulated initiator is introduced into the coaxial cavity.

3. B2 was repeated with resin A5.

4. 100 parts of resin A4 were mixed at room temperature with 1.8 parts of magnesium oxide, 400 parts of quartz and 12 parts of cellulose-microencapsulated (diameter 0.1 mm) benzoyl peroxide (50% strength in diethyl phthalate). The material was introduced into a blister pack with blisters 13 mm in diameter and 90 mm in length and sealed in. After one week the material had consolidated and the plugs could be removed.

C. Use of the plugging compounds

The self-supporting plugging compounds of B1 to B4 were inserted into 110 mm deep drill-holes (diameter 14.3 mm) in a concrete wall. Anchor bolts (thread M12, length 150 mm) were driven into the compound by means of a hammer action drill. After 60 min at 23° C. the compounds were fully cured. The load values were determined in pull-out trials. For this the anchor was pulled out using a support (diameter 40 mm). In each case the steel was observed to fail (anchor bolt broke). The load values determined were located in a small range around 50 kN.

We claim:

1. A plugging compound comprising
    A. a free-radically polymerizable vinyl ester or vinyl ester urethane resin,
    B. optionally a methacrylic ester comonomer having a boiling point higher than 120° C.,
    C. a free-radical initiator,
    D. a polymerization accelerant,
    E. a thickener for the resin, and
    F. a filler, said plugging compound being in the thickened state and a self-supporting and storage-stable material which can be introduced in that form directly into a drill-hole and said free-radical initiator C or said accelerant D being embedded in the matrix of the other ingredients as a separate phase spatially separated from said matrix.

2. A plugging compound as claimed in claim 1 having a firm, form-stable consistency and a dry surface.

3. A plugging compound as claimed in claim 1, wherein said comonomer B is butanediol dimethacrylate.

4. A plugging compound as claimed in claim 1, wherein said compound comprises comonomer B.

5. A process for preparing the plugging compound of claim 1, which comprises mixing liquid resin A and components B–F together, forming the mixture to shape it into a strand, thickening and optionally cutting it into cylindrical pieces.

6. A process as claimed in claim 5, wherein all components are mixed together, the mixture is converted into strand form and allowed to thicken at temperatures below 50° C.

7. A process as claimed in claim 5, wherein all components except for initiator C are mixed together, the mixture is converted into strand form with one or more cavities, thickened at temperatures above about 50° C., the strand is cooled and the initiator C is introduced into the one or more cavities.

8. A process for preparing the plugging compound of claim 1, which comprises optionally initially charging fillers F into a hollow mold, adding liquid resin A together with all remaining components into said mold, thickening, and demolding the plugging compound.

9. A process as claimed in claim 8, wherein the reactive resin A is introduced together with the remaining components into a heated hollow mold, thickened, and the plugging compound is demolded.

10. A plugging compound as claimed in claim 1, wherein the thickening agent is an oxide or hydroxide of magnesium, calcium, lithium or aluminum, combined with a carboxyl-containing vinyl polymer or a partial ester of a polyether polyol and a dicarboxylic anhydride as a thickening additive.

* * * * *